United States Patent
Van Riper (10) Patent No.: US 8,973,637 B2
(45) Date of Patent: Mar. 10, 2015

(54) TIRE WITH OPTIMIZED APEX

(75) Inventor: Philip Carl Van Riper, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 80 days.

(21) Appl. No.: 13/096,033

(22) Filed: Apr. 28, 2011

(65) Prior Publication Data
US 2012/0160391 A1    Jun. 28, 2012

Related U.S. Application Data (60) Provisional application No. 61/426,109, filed on Dec. 22, 2010.

(51) Int. Cl.
  *B60C 15/00* (2006.01)
  *B60C 15/06* (2006.01)
  *B60C 1/00* (2006.01)

(52) U.S. Cl.
  CPC ............. *B60C 15/06* (2013.01); *B60C 15/0607* (2013.01); *B60C 2001/005* (2013.01); *B60C 15/0603* (2013.01); *B60C 2001/0058* (2013.01); *B60C 2015/0621* (2013.01)
  USPC ............. 152/541; 152/539; 152/546; 152/547

(58) Field of Classification Search
  CPC .... B60C 15/00; B60C 15/06; B60C 15/0603; B60C 15/0607; B60C 2001/0058; B60C 2015/0696
  USPC .................................................. 152/539–547
  IPC ............................................ B60C 15/00, 15/06
  See application file for complete search history.

(56) References Cited

U.S. PATENT DOCUMENTS

| | | | | |
|---|---|---|---|---|
| 5,429,169 | A * | 7/1995 | Igarashi et al. | 152/454 |
| 6,223,797 | B1 * | 5/2001 | Shida et al. | 152/532 |
| 7,278,455 | B2 | 10/2007 | Hedo et al. | |
| 2006/0207709 | A1 * | 9/2006 | Tanaka et al. | 152/541 |
| 2008/0087363 | A1 * | 4/2008 | Wakatsuki | 152/541 |

FOREIGN PATENT DOCUMENTS

| | | | | |
|---|---|---|---|---|
| EP | 1707402 | 10/2006 | | B60C 1/00 |
| EP | 1834814 | 9/2007 | | B60C 15/06 |
| EP | 2298579 | 3/2011 | | B60C 15/06 |

(Continued)

OTHER PUBLICATIONS

Summary: JP03220007; Yokoyama et al.; (No date).*

(Continued)

*Primary Examiner* — Justin Fischer
*Assistant Examiner* — Kendra Shin
(74) *Attorney, Agent, or Firm* — June E. Rickey (57) ABSTRACT

A pneumatic tire is described having a triangular shaped apex which extends radially outward of the bead core, and wherein the apex is formed of at least two zones. Each zone is formed of a different material, wherein the first zone extends from the base of the apex to the tip of the apex, and the second zone is located adjacent the ply. The zones are preferably formed by extrusion to form one cohesive apex. The first zone is formed of a material having a G"/G' ratio in the range of about 0.155 to about 0.183. The second zone is formed of a material having a G"/G' ratio in the range of about 0.125 to about 0.133.

3 Claims, 7 Drawing Sheets

(56) References Cited

FOREIGN PATENT DOCUMENTS

| JP | 03220007 A | * | 9/1991 | ............ B60C 15/06 |
| JP | H11278018 A | | 10/1999 | |
| JP | 2005271725 A | * | 10/2005 | ............ B60C 15/06 |
| WO | WO2005102741 A1 | | 11/2005 | |

OTHER PUBLICATIONS

Machine Translation: JP2005-271725; Kuroki, Takeshi; (no date).*
European Search Report completed Apr. 5, 2012.
Chinese Search Report (CN1946576A cited; English abstract provided in WO2005/102741A1).

* cited by examiner

TIRE WITH OPTIMIZED APEX

CROSS REFERENCE TO OTHER APPLICATIONS

This application claims the benefit of and incorporates by reference U.S. Provisional Application No. 61/426,109, filed Dec. 22, 2010.

FIELD OF THE INVENTION

The invention relates in general to tire manufacturing, and more particularly to a tire component such as an apex.

BACKGROUND OF THE INVENTION

Tire manufacturers have progressed to more complicated designs due to an advance in technology as well as a highly competitive industrial environment. In particular, tire designers seek to use multiple rubber compounds in a tire in order to meet customer demands. Using multiple rubber compounds per tire can result in a huge number of compounds needed to be on hand for the various tire lines of the manufacturer. For cost and efficiency reasons, tire manufacturers seek to limit the number of compounds available due to the extensive costs associated with each compound. Each compound typically requires the use of a Banbury mixer, which involves expensive capital expenditures. Furthermore, Banbury mixers have difficulty mixing up tough or stiff rubber compounds. The compounds generated from the Banbury mixers are typically shipped to the tire building plants, thus requiring additional costs for transportation. The shelf life of the compounds is not finite, and if not used within a certain time period, is scrapped.

Thus an improved method and apparatus is desired which substantially reduces the need for the use of Banbury mixers while providing an apparatus and methodology to provide custom mixing at the tire building machine by blending of two or more compounds together, and controlling the ratio of the compounds and other additives. Both non-productive compounds and productive compounds could be blended together. It is further desired to have a system at the tire building machine which provides for the ability to manufacture customizable compounds with accelerators. Yet an additional problem to be solved is to generate the compounds continuously at the tire building machine.

One component of interest is the tire apex. The tire apex is of interest because an optimal design can lower tire rolling resistance. The tire apex is subject to varying levels of stress and strain depending upon the use. Selection of apex materials is often a compromise due to the nature of the stress-strain loading being location specific. In order to optimize the apex design, the optimal material needs to be selected. Thus an improved apex design is desired which improves rolling resistance.

DEFINITIONS

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers.

"Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means a portion of a tire between the tread and the bead.

"Laminate structure" means an unvulcanized structure made of one or more layers of tire or elastomer components such as the innerliner, sidewalls, and optional ply layer.

"Productive compound" means a rubber compound that includes accelerators, sulfur and other materials needed to cure the rubber.

"Non-productive compound" means a rubber compound that does not have one or more of the following items: 1) accelerator; 2) sulfur; or 3) curing agent(s).

BRIEF DESCRIPTION OF THE DRAWINGS

The invention will be described by way of example and with reference to the accompanying drawings in which.

DETAILED DESCRIPTION OF THE INVENTION

I. Tire Construction

Figure 1:
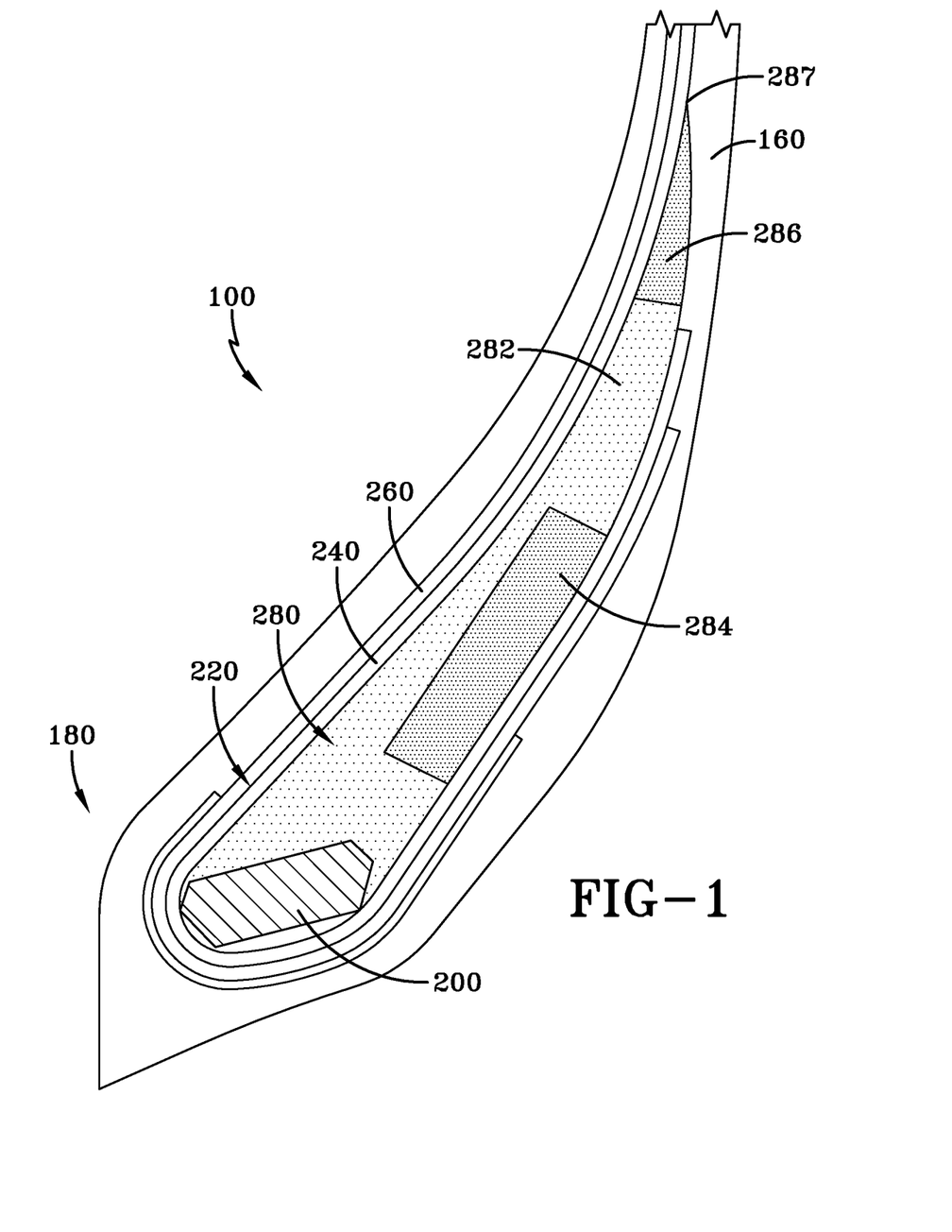
FIG. 1 is a cross-sectional view of a tire bead area in accordance with the invention.

FIG. 1 illustrates a bead area of a tire 100 of the present invention. The tire may be a passenger tire, a truck tire, a run flat tire or pneumatic tire suitable for other applications. The tire has conventional tire components such as a ground-engaging tread (not shown) that terminates in the shoulders at the lateral edges of the tread. Sidewalls 160 extend from the shoulders 140 and terminate in a pair of bead portions 180, each bead portion 180 has an annular inextensible bead core 200. The bead cores 200 are preferably constructed of a single or monofilament steel wire continuously wrapped and a suitable bead core construction is described in U.S. Pat. No. 5,263,526. The tire 100 has a carcass reinforcing structure 220 that extends from the first bead portion 180 through the first sidewall 160, tread 120, second sidewall portion 160 to the second bead portion 180.

The carcass reinforcing structure 220 comprises at least one reinforcing ply. In the illustrated embodiment, there is a first radially inner reinforcing ply structure 240, the ends of which are turned up around the bead cores 200, and may further include an optional second radially outer second reinforcing ply structure 260, the ends of which are turned about the bead cores 200. Each ply 240, 260 is formed from a single layer of parallel reinforcing cords. The cords may be made of any material normally used for cord reinforcement of rubber articles, for example, and not by way of limitation, rayon, nylon, polyester, and steel. Preferably, the cords are made of material having a high adhesion property with rubber and high heat resistance. While this embodiment has shown only two plies, any number of carcass plies may be used.

Located within each bead portion 180 and the radially inner portion of the sidewall 160 is an elastomeric apex 280 disposed between carcass plies 240, 260 and the turnup ends of the first carcass ply 240. The elastomeric apex 280 extends from the radially outer side of the bead cores 200 and up into the sidewalls 160, gradually decreasing in cross-sectional width. The apex 280 terminates prior to the maximum section width of the tire 100.

The apex 280 is preferably divided into at least two zones 282, 284. The first zone 282 extends from the outer surface of the bead to the tip 287. The first zone 282 is formed of a first material designed to optimize the energy controlled deformation and is further described below. The apex further comprises and a second zone 284 which is located adjacent the ply turnup and at a radial location of between 1 to 4 bead diameters as measured from the center of the bead. The second zone is formed of a second material different than said first material, and designed to control or minimize the strain in the second zone. As shown in FIG. 1, the second zone is rectangular in shape and has a length oriented primarily in the radial direction and having a length of 2-3 bead diameters, and a width about ⅔ the width of the apex.

The apex 280 may further optionally comprise a third zone 286 which is the tip of the apex. The third zone may comprise the same material as the second zone.

Rolling resistance is directly related to energy loss Q of each tire component. Energy loss Q is directly proportionate to G" or loss modulus, and also directly proportionate to G' or storage modulus, as represented below.

$$Q \approx G''^{*}(G')^{m-1}$$

M is the deformation index. The deformation index can be further subdivided into three pure modes of deformation M=+1 for strain control M=0 for energy control M=−1 for stress control.

Figure 2:
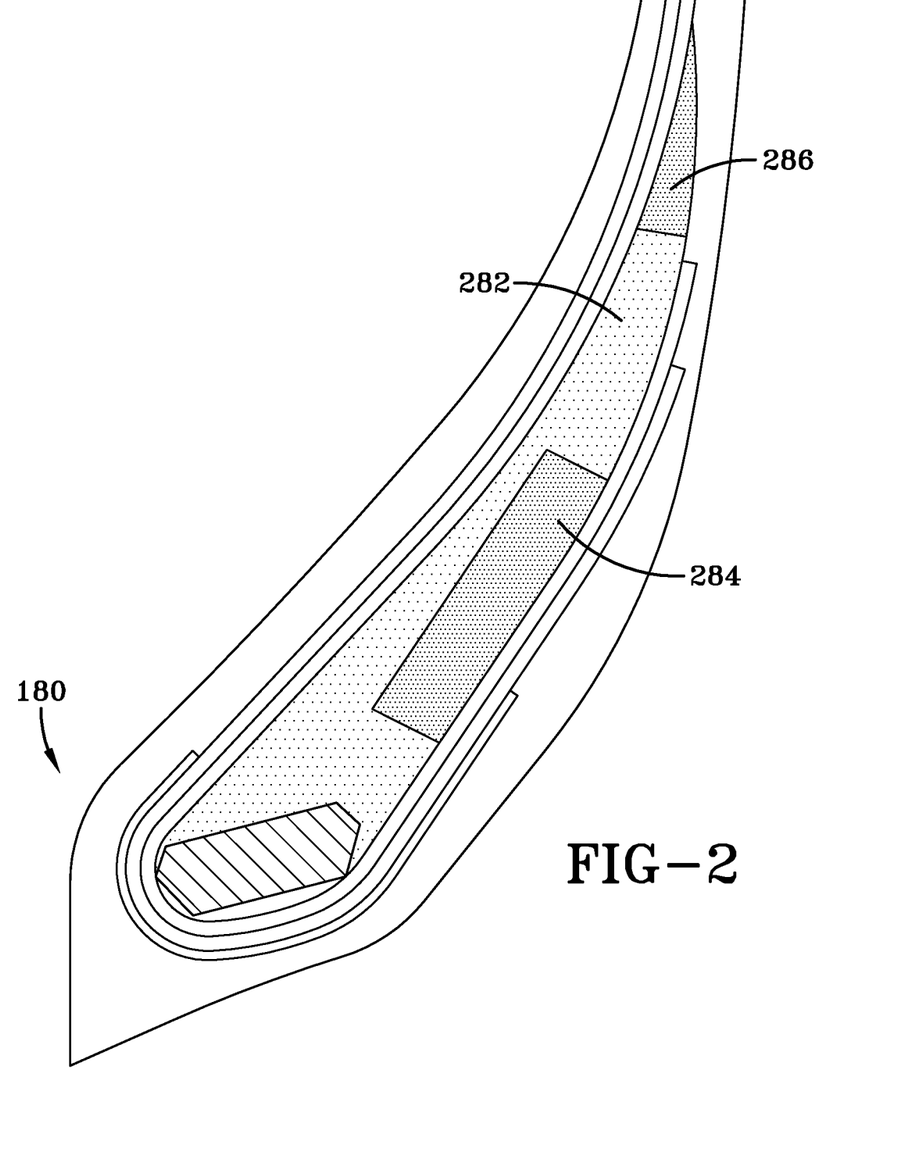
FIG. 2 is a stress strain diagram of the bead area of FIG. 1.

Thus depending upon the specific tire application, the tire apex can be subdivided into distinct energy control, stress control and strain control zones. FIG. 2 illustrates finite element analysis of a radial medium truck tire wherein the apex has been analyzed. Shown in FIG. 2, the apex has two primary zones: an energy control zone 282, and a strain control zone. The apex may further comprise a third zone 286 for strain control at the tip. In each zone, the heat generation and thus the rolling resistance can be minimized by optimizing the material properties. For the stress control zone a material is selected such that the G"/G' ratio is minimized. For the energy control, G"/G' or tan delta is minimized. And for strain control, G" is minimized.

For the apex as shown in FIGS. 1 and 2, the first zone 282 is formed of a material having a G"/G' ratio in the range of about 0.155 to about 0.183. The second zone 284 and third zone 286 is formed of a material having a G"/G' ratio in the range of about 0.125 to about 0.133.

| Deformation control | Target G"/G' |
|---|---|
| Strain | .125-.133 |
| Energy | .155-.183 |
| Stress | .200-.245 |

Unless otherwise noted, all G' values are measured on a rubber sample at a sample temperature of 90° C., at a measurement frequency of 10 Hz and at a strain amplitude of 50%. The rubber sample is taken from a cured tire manufactured to the desired manufacturer specifications. For the purposes of this invention, the storage modulus property G' is a viscoelastic property of a rubber composition and may be determined by a dynamic mechanical analyzer over a range of frequencies, temperature and strain amplitude. One example of a dynamic mechanical analyzer (DMA) suitable for measuring G', G" is model number DMA+450 sold by the 01-dB Metravib company. The DMA instrument uses dynamic mechanical analysis to evaluate rubber compositions. A cured sample of the respective rubber composition is subjected to a precisely controlled dynamic excitation (frequency and amplitude) at a frequency (Hertz) and temperature (° C.) and the sample stress response is observed by the instrument. The observed sample response can be separated, by the instrument, into viscous or loss modulus (G") and elastic or storage modulus (G') components. Unless otherwise indicated, all G" are measured at the same conditions as G'.

In order to form the apex of multiple zones of different materials, the extruder apparati as described below may be utilized to continuously extrude an apex having the desired material zones. A computer controller may be used to divide the apex into a grid of small discrete annular subareas. For each discrete subarea, the desired material properties are selected. The extruder apparatus of FIG. 6 or 7 may be used to continuously extrude a strip of a first rubber compound having the desired characteristics of zone 1. The extruder apparatus may also be used to extrude a second rubber compound having the desired characteristics of zone 2. The apex may be divided into multiple zones, wherein each zone has a different material composition.

Figure 3:
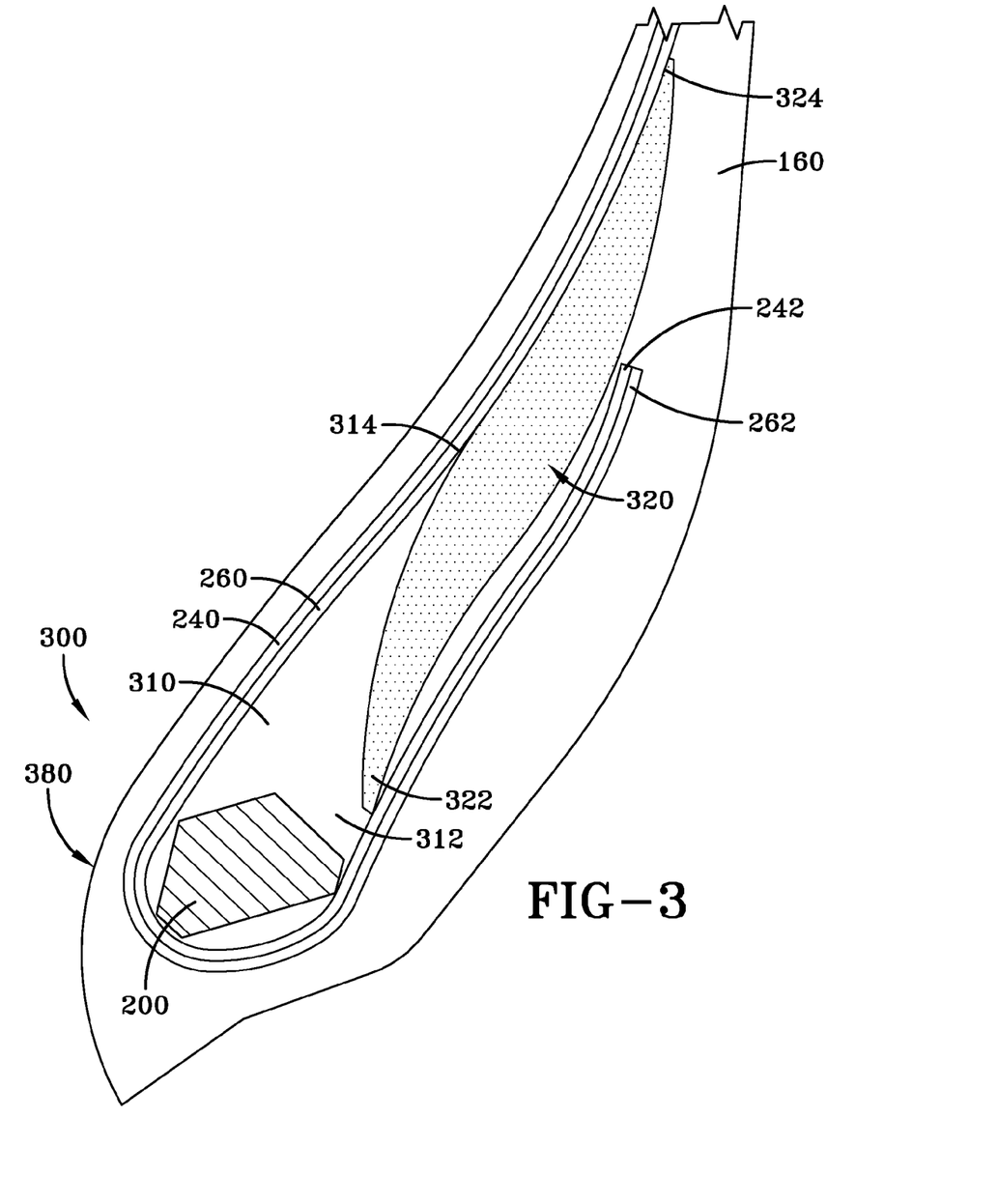
FIG. 3 is a schematic of a second embodiment of a tire bead area in accordance with the invention.
Figure 4:
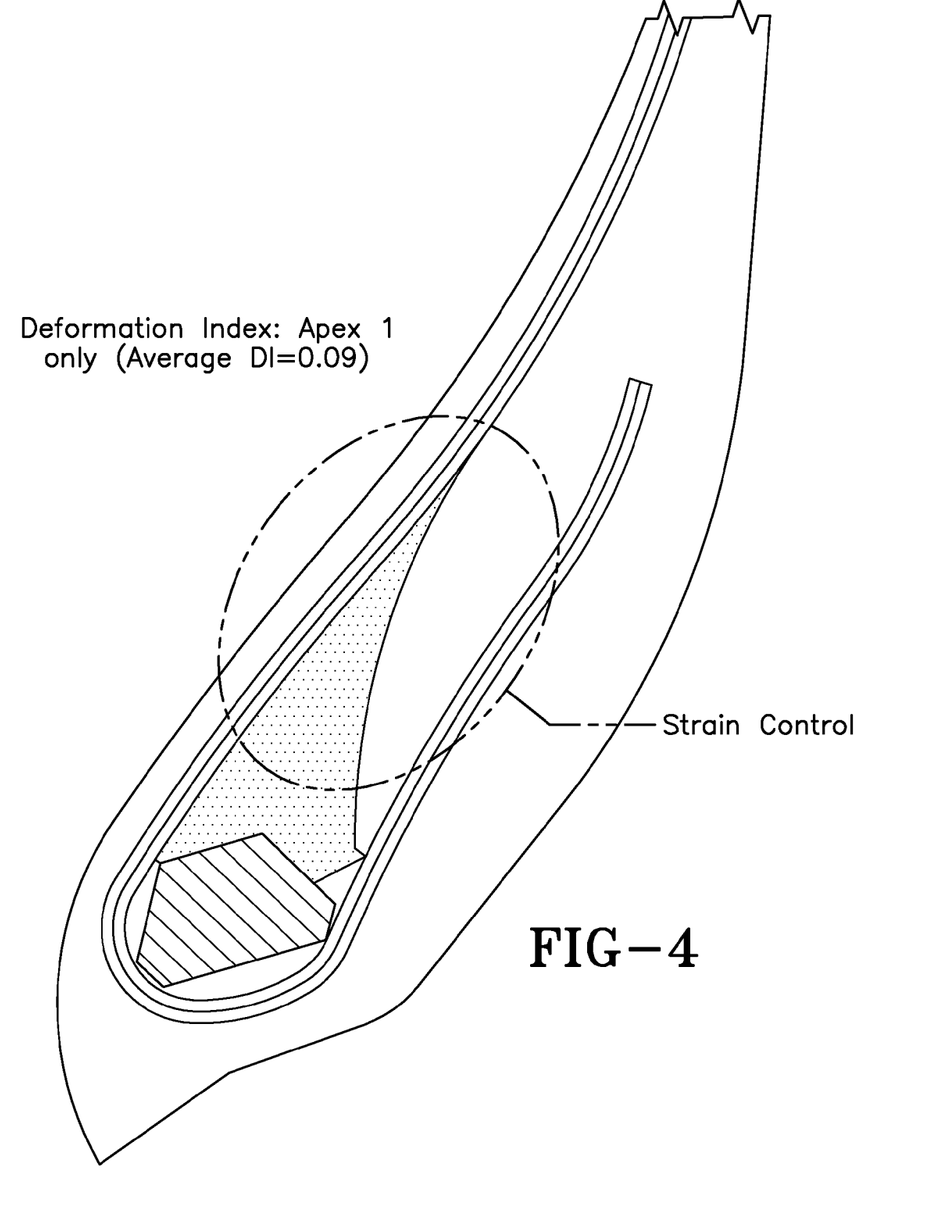
FIGS. 4 and 5 are stress strain diagram of first and second apex of the bead area of FIG. 3.

FIGS. 3 and 4 illustrate a second embodiment of a bead area 300 of the present invention. The tire components are the same as described above, except for the apexes as described in detail, below. The bead area 300 is comprised of a first apex 310 and a second apex 320. The first apex 310 is located radially inward of the second apex, and has a base 312 located adjacent the bead core 200, and extends radially outward in a triangular shape forming a tip 314. Located adjacent the first apex is the second apex 320. The second apex 320 has a first end 322 located axially outward of the first apex and axially inward of the ply turnups 242, 262. The first end 322 extends radially inward in the vicinity of the bead core 200. The second apex extends radially outward from the first end 322 and extends well past the tip 314 of the first apex and up into the sidewall area ending in second end 324 in the mid portion of the sidewall.

Figure 5:
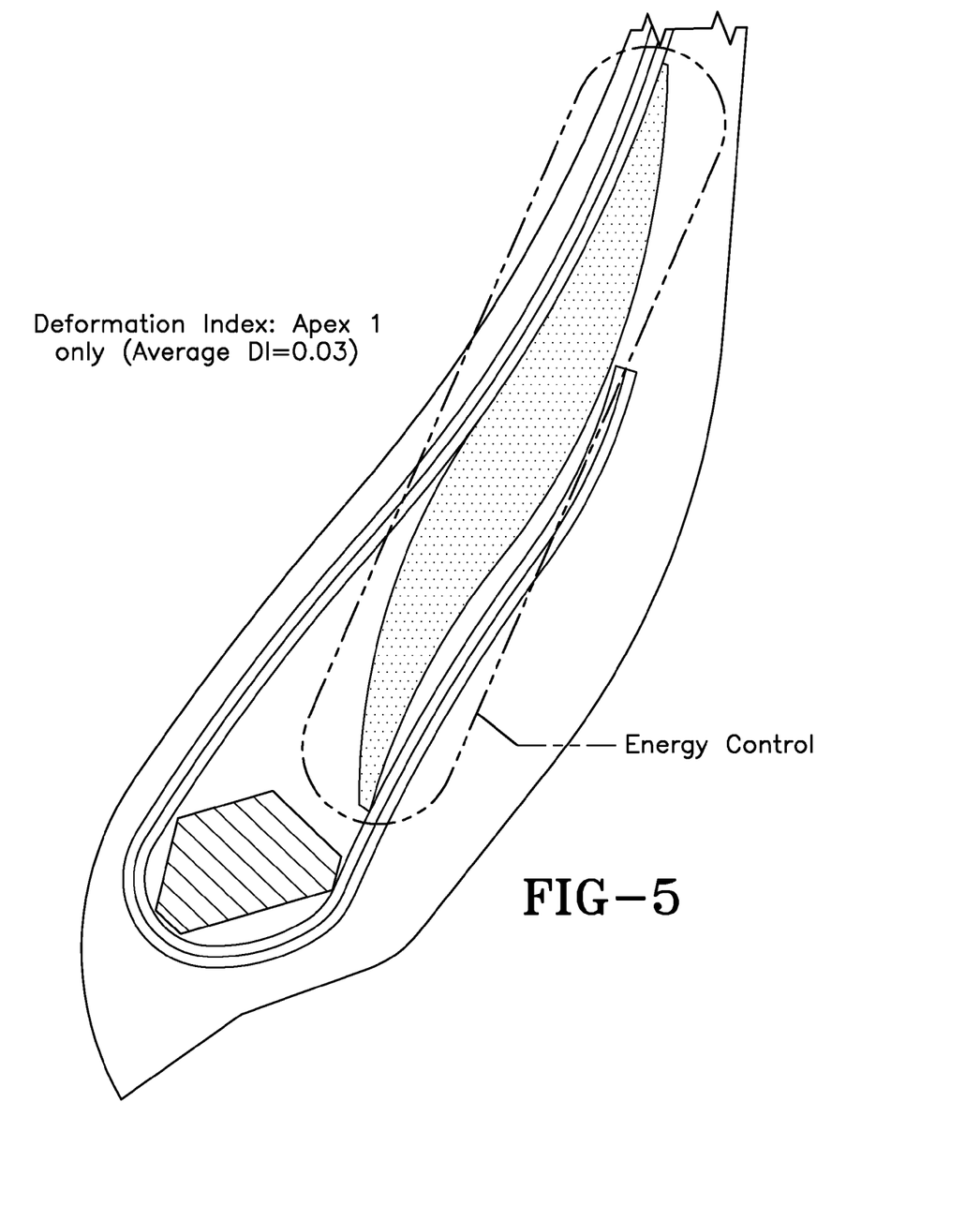

The first apex 320 is shown under a stress-strain finite element analysis in FIG. 4. The average deformation index for the first apex is 0.09, so that the apex in its entirety is under strain control. For strain control, the first apex 310 should be formed of a material having a G"/G' ratio in the range of about 0.125 to about 0.133. The second apex 320 is shown under a stress-strain finite element analysis in FIG. 5. The average deformation index for the second apex 320 is 0.03, so that the apex is under energy control. For energy control, the second apex 320 is preferably selected from a material having a. G"/G' ratio in the range of about 0.155-0.183.

II. Apparatus

Figure 6:
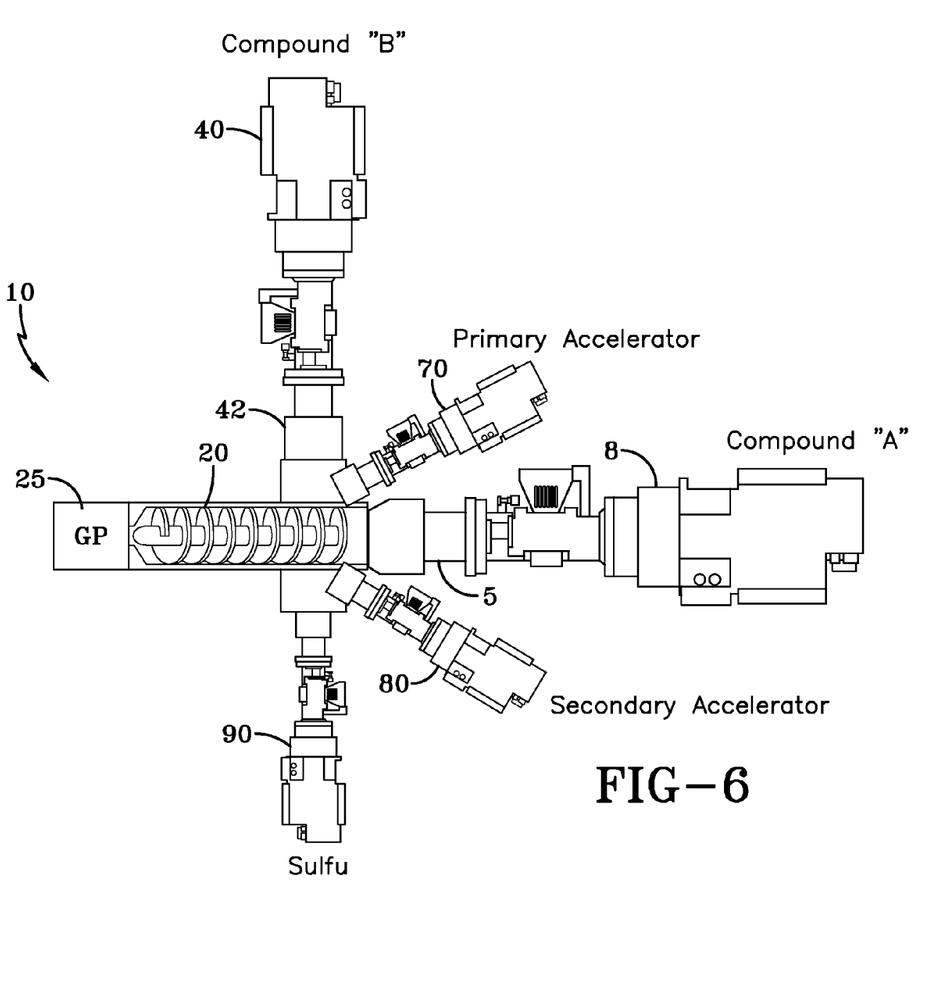
FIGS. 6 and 7 are schematics of mixing systems suitable for forming the inventions.

FIG. 6 illustrates a first embodiment of a method and apparatus 10 for a continuous mixing system suitable for use for making rubber compositions for tires or tire components. The continuous mixing system 10 is not limited to tire applications and may be used for example, to make other rubber components not related to tires such as conveyors, hoses, belts, etc. The continuous mixing system is particularly suited for making small tire components having a varying composition, such as inserts, apexes and treads (including those for retreaded tires). The mixing system may be provided directly at the tire or component building station for direct application of the rubber composition to a tire building drum or other component building apparatus. As shown in FIG. 6, the continuous mixing apparatus 10 includes a main extruder 20. The main extruder 20 has an inlet 22 for receiving one or more rubber compositions as described in more detail, below. The main extruder may comprise any commercial extruder suitable for processing of rubber or elastomer compounds. The extruder may comprise a commercially available extruder commonly known by those skilled in the art as a pin type extruder, a twin screw or a single screw extruder, or a ring type of extruder. One commercially available extruder suitable for use is a multicut transfermix (MCT) extruder, sold by VMI Holland BV, The Netherlands. Preferably, the extruder has a length to diameter ratio (L/D) of about 5, but may range from about 3 to about 5. A ring type, pin type or MCT type of extruder is preferred, but is not limited to same. The main extruder 20 functions to warm up the compound A to the temperature in the range of about 80° C. to about 150° C., preferably about 90° C. to about 120° C., and to masticate the rubber composition as needed.

The main extruder inlet 22 receives a first compound A, which may be a productive or non-productive rubber composition. Examples of compound A compositions are described in more detail, below. Compound A is first extruded by a first extruder 8 and optionally a second pump 5, preferably a gear pump. The extruder 8 may be a conventional pin type, ring type, dual screw or single screw type extruder. The pump 5 functions as a metering device and a pump and may have gears such as planetary gears, bevel gears or other gears. The extruder 8 and gear pump 5 may also be a combination unit. Preferably, the extruder 8 has an L/D of about 3, but may range from about 3 to about 6.

A second compound, referred to as "compound B" also enters the main extruder 20 at the inlet 22 and is mixed together with compound A as the compounds travel through the main extruder. Compound B may also comprise a productive or non-productive rubber composition. Examples of compound B compositions are described in more detail, below. Compound B is first extruded by second extruder 40 and optionally a second pump 42, preferably a gear pump. The extruder 40 may be a conventional pin type, ring type, dual screw or single screw type extruder. The pump 42 functions as a metering device and a pump and may have gears such as planetary gears, bevel gears or other gears. The extruder 40 and gear pump 42 may also be a combination unit. Preferably, the extruder 40 has an L/D of about 3, but may range from about 3 to about 6.

The main extruder 20 blends compound A and compound B together in a precisely controlled amount. Oil may also be optionally injected into the main extruder 22 via an oil pump 60. The oil pump may be located at any desired location, but is preferably located at the inlet 22. The oil controls the viscosity of the compound mixture.

The apparatus 10 may further include a first additive pump 70 for pumping one or more additives such as a primary accelerator, which is added to the mixture at the main extruder inlet 22. The apparatus may further include a second additive pumping device 80 for pumping one or more additives such as a secondary accelerator into the main extruder inlet 22. The additive pumps 70, 80 may be gear pumps, gear pump extruders, Venturi pumps or other pumping means known to those skilled in the art.

If more than one accelerator is used, they may be added into the mixture separately or together. For example, a primary accelerator and a secondary accelerator may both be added. Accelerators are used to control the time and/or temperature required for vulcanization and to improve the properties of the rubber. The accelerator may be in powder form or an encapsulated powder into a resin or rubber base. Examples of accelerator compositions are described in more detail, below.

Other additives include a curative agent or precursor, which may also be added to the mixer via additive pump 90. One example of a curative agent is sulfur. The sulfur may be added in solid form. The additive pump 90 may be a gear pump, gear pump extruder combination, Venturi pump or other pumping means known to those skilled in the art.

Thus all of the constituents including compound A, compound B, sulfur, oil and any desired curative agents or precursors, or accelerators of the desired rubber composition are added to the inlet of the main extruder 20. The main extruder blends all the constituents together and produces an output mixture of compound C which is a precise mixture of the A and B compound, optional oil the optional accelerant and optional additives. The output mixture of compound C exits the main extruder and enters an optional gear pump 25. The optional gear pump 25 and main extruder 20 is preferably located in close proximity adjacent a tire component building station or tire building station 95 for direct application onto a core, mandrel, blank or tire building drum, as shown in FIG. 6. Gear pump 25 preferably has a special nozzle 95 or shaping die which applies the compound formulation output from the mixer exit directly onto the tire building machine 95 in strips which are wound onto a tire building drum or core.

The ratio of the volumetric flow rate of compound A to the volumetric flow rate of compound B is precisely controlled by the ratio of the speed of the gear pump 5 for compound A and the speed of gear pump 42 for compound B. For example, the compound output from the system 10 may comprise a ratio of 20% of compound A and 80% of compound B by volume, as shown in FIG. 3. Alternatively, the compound output from the system may comprise a mixture D having a ratio of 35% of compound B and 65% of compound A by volume. Alternatively, the compound output from the system may comprise a mixture Z having a ratio of 10% of compound B and 90% of compound A by volume. The ratio of compound A to compound B can thus range from 0:100% to 100%:0. The ratio may be adjusted instantaneously by varying the speeds of gear pumps 25 and 42 by a computer controller 99. The computer controller 99 may additionally controls the extruder and gear pump operating parameters such as operating pressure, operating temperature, pump or screw speed.

Preferably, the computer controller 99 sets a pressure target value for the exit pressure of each extruder. The extruder speed is controlled by the controller, and is varied until the pressure target is met. The pressure target value affects the quality of mixing by causing backflow of the material in the extruder.

The system 10 of the present invention advantageously has a short residence time due to the following design features. First, all the components of compound C are added at the inlet of the main extruder. Because all the ingredients are added at the exact same location, precise formulations can be generated and controlled. Second, each extruder has a small length to diameter ratio. Third, the system is preferably located adjacent a component building station or tire building station to minimize the system line lengths in order to further reduce system residence time.

Figure 7:
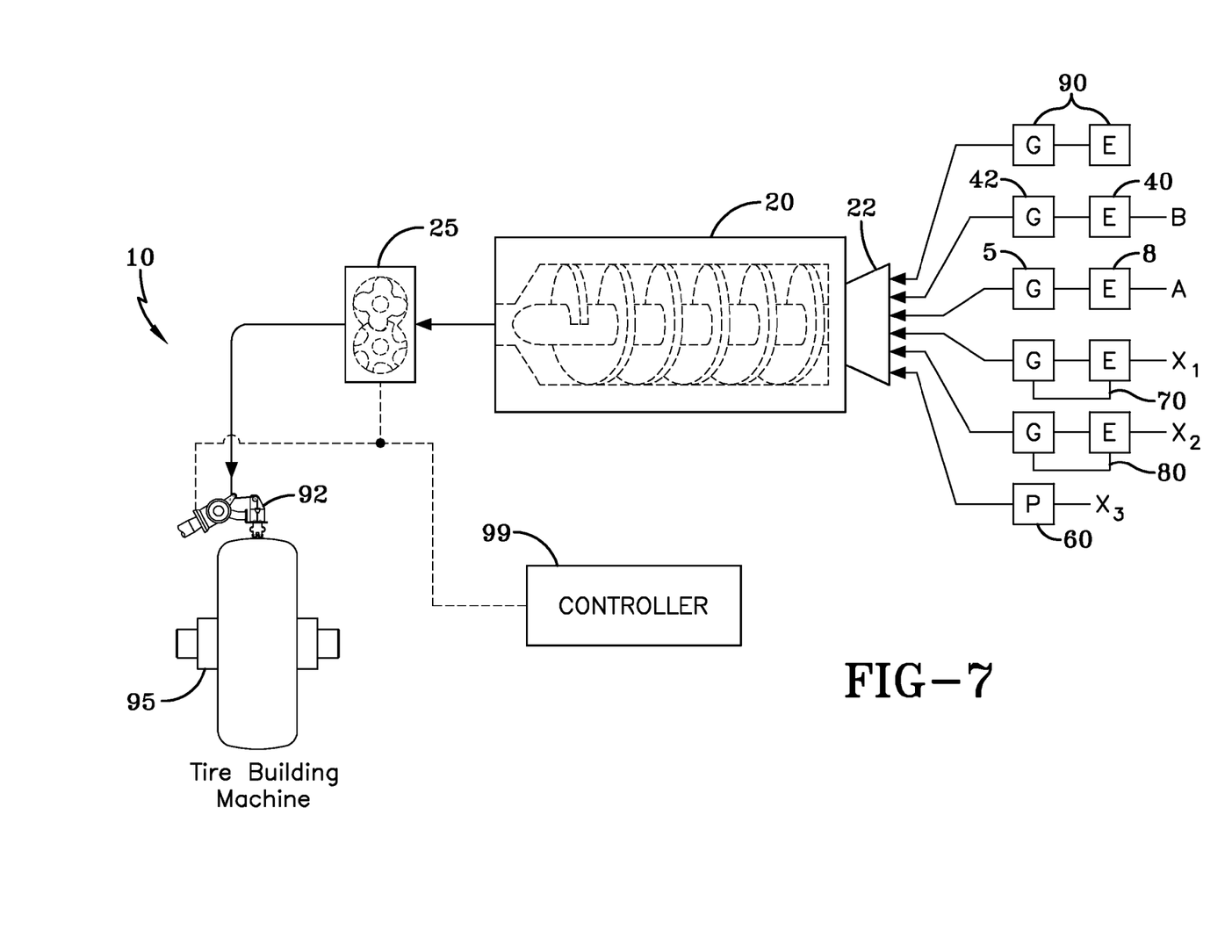

FIG. 7 illustrates a second embodiment of the extruder apparatus of the present invention. Everything is the same as described above, except for the following. Compound A is fed into the inlet 22 of the main extruder 20. Compound B passes through an extruder 40 in combination with a gear pump 42 as described above, and then is fed into the main extruder at a specific upstream location identified herein for reference purposes as "L." A primary accelerator is pumped through a pumping device 70 and enters the main extruder at the same location L. An optional secondary accelerator passes through a pumping device 80 and then enters the main extruder 20 at the same location L. Other additives include a curative agent or precursor, which may also be added to the mixer at location L via additive pump 90. Thus the addition of all the ingredients at the same extruder location allows for precise control of the compound constituents.

The following are compositions which may be used in conjunction with the invention.

III. Accelerator Compositions

In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanized rubber. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

IV. Rubber Compositions

Representative rubbers that may be used in the rubber compound include acrylonitrile/diene copolymers, natural rubber, halogenated butyl rubber, butyl rubber, cis-1,4-polyisoprene, styrene-butadiene copolymers, cis-1,4-polybutadiene, styrene-isoprene-butadiene terpolymers ethylene-propylene terpolymers, also known as ethylene/propylene/diene monomer (EPDM), and in particular ethylene/propylene/dicyclopentadiene terpolymers. Mixtures of the above rubbers may be used. Each rubber layer may be comprised of the same rubber composition or alternating layers may be of different rubber composition.

The rubber compound may contain a platy filler. Representative examples of platy fillers include talc, clay, mica and mixture thereof. When used, the amount of platy filler ranges from about 25 to 150 parts per 100 parts by weight of rubber (hereinafter referred to as phr). Preferably, the level of platy filler in the rubber compound ranges from about 30 to about 75 phr.

The various rubber compositions may be compounded with conventional rubber compounding ingredients. Conventional ingredients commonly used include carbon black, silica, coupling agents, tackifier resins, processing aids, antioxidants, antiozonants, stearic acid, activators, waxes, oils, sulfur vulcanizing agents and peptizing agents. As known to those skilled in the art, depending on the desired degree of abrasion resistance, and other properties, certain additives mentioned above are commonly used in conventional amounts. Typical additions of carbon black comprise from about 10 to 150 parts by weight of rubber, preferably 50 to 100 phr. Typical amounts of silica range from 10 to 250 parts by weight, preferably 30 to 80 parts by weight and blends of silica and carbon black are also included. Typical amounts of tackifier resins comprise from about 2 to 10 phr. Typical amounts of processing aids comprise 1 to 5 phr. Typical amounts of antioxidants comprise 1 to 10 phr. Typical amounts of antiozonants comprise 1 to 10 phr. Typical amounts of stearic acid comprise 0.50 to about 3 phr. Typical amounts of accelerators comprise 1 to 5 phr. Typical amounts of waxes comprise 1 to 5 phr. Typical amounts of oils comprise 2 to 30 phr. Sulfur vulcanizing agents, such as elemental sulfur, amine disulfides, polymeric polysulfides, sulfur olefin adducts, and mixtures thereof, are used in an amount ranging from about 0.2 to 8 phr. Typical amounts of peptizers comprise from about 0.1 to 1 phr.

V. Oil

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom.

Variations in the present inventions are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic tire comprising a carcass, the carcass having one or more cord reinforced plies and a pair of bead portions, each bead portion having at least one annular inextensible bead core about which the cord reinforced plies are wrapped, a tread and a belt reinforcing structure disposed radially outward of the carcass, the bead portion further comprising a triangular shaped apex which extends radially outward of the bead core, wherein the apex is formed of at least three zones, wherein a second and a third zone is formed of the same material that is different than the material of a first zone, wherein the third zone is located at the outer tip of the apex, the first zone extends from the base of the apex radially outward towards the third zone, and the second zone is spaced from said bead core and located directly adjacent so as to contact the ply turnup and having a radial length of 2-3 bead diameters, wherein the second zone and the third zone are completely separated from each other by the first zone.

2. The tire of claim 1 wherein the first zone is formed of a material having a G"/G' ratio in the range of about 0.155 to about 0.183.

3. The tire of claim 1 wherein the second zone and third zone is formed of a material having a G"/G' ratio in the range of about 0.125 to about 0.133.

* * * * *